US006882931B2

(12) United States Patent
Inoue

(10) Patent No.: US 6,882,931 B2
(45) Date of Patent: Apr. 19, 2005

(54) NAVIGATION SYSTEM

(75) Inventor: Koichi Inoue, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 4 days.

(21) Appl. No.: 10/699,787

(22) Filed: Nov. 4, 2003

(65) Prior Publication Data
US 2004/0111215 A1 Jun. 10, 2004

(30) Foreign Application Priority Data
Dec. 4, 2002 (JP) ........................................ 2002-352788

(51) Int. Cl.[7] .......................... G01C 21/30; G08G 1/123
(52) U.S. Cl. ................... 701/201; 701/209; 340/995.14; 700/156; 707/100
(58) Field of Search ................................. 701/201, 209, 701/210, 211, 207, 212; 340/995.14, 995.1, 995.21, 995.15, 988, 990, 460, 995.19; 700/156, 157; 707/4, 100, 102, 104.1, 200

(56) References Cited

U.S. PATENT DOCUMENTS

| 5,184,303 | A | * | 2/1993 | Link .......................... 701/210 |
| 5,899,955 | A | * | 5/1999 | Yagyu et al. ................ 701/209 |
| 5,977,885 | A | * | 11/1999 | Watanabe .............. 340/995.19 |
| 6,052,645 | A | * | 4/2000 | Harada ....................... 701/212 |
| 6,233,521 | B1 | * | 5/2001 | Nomura ....................... 701/208 |
| 6,314,370 | B1 | * | 11/2001 | Curtright ..................... 701/213 |
| 6,456,931 | B1 | * | 9/2002 | Polidi et al. ................ 701/208 |
| 6,477,526 | B1 | * | 11/2002 | Hayashi et al. ................ 707/4 |
| 6,574,553 | B1 | * | 6/2003 | Beesley et al. ............. 701/209 |
| 6,721,655 | B1 | * | 4/2004 | Utsumi ....................... 701/210 |
| 2001/0020213 | A1 | * | 9/2001 | Hatano ....................... 701/207 |
| 2003/0036827 | A1 | * | 2/2003 | Murphy .......................... 701/3 |

FOREIGN PATENT DOCUMENTS

| JP | 7-134795 A | | 5/1995 | |
| JP | 9-89580 A | | 4/1997 | |
| JP | 10207354 A | * | 8/1998 | ........... G09B/29/00 |
| JP | 2000-131086 A | | 5/2000 | |
| JP | 2001074478 A | * | 3/2001 | ........... G01C/21/00 |
| JP | 2002277267 A | * | 9/2002 | ........... G01C/21/00 |

* cited by examiner

Primary Examiner—Thomas G. Black
Assistant Examiner—Tuan C. To
(74) Attorney, Agent, or Firm—Birch, Stewart, Kolasch, & Birch, LLP

(57) ABSTRACT

A map data reading and processing section acquires map information belonging to a hierarchical structure classified depending on coverage of a road map, a remote controller specifies a bypass region to bypass traffic of a vehicle in response to an input operation, and the route search processing section of a navigating function section searches for a route that detours the bypass region when the bypass region is included within the coverage of the map information belonging to a hierarchy acquired by the map data reading and processing section.

7 Claims, 6 Drawing Sheets

NAVIGATION SYSTEM

This Nonprovisional application claims priority under 35 U.S.C. §119(a) on Patent Application No(s). 2002-352788 filed in JAPAN on Dec. 4, 2003, the entire contents of which are hereby incorporated by reference.

BACKGROUND OF THE INVENTION

1. Field of the Invention

The present invention relates to a navigation system.

2. Description of the Related Art

Among conventional navigation systems, there has been a navigation system in which if there is a point unwilling to pass at all costs, such a system searches for a route that detours the point and guides a driver. In searching for routes to the destination and guiding a driver, this navigation system searches for a route to be incurred the lowest search cost to the destination with a detour point being set and a search cost of a route passing the detour point being set high. For instance, cf. JP 09-089580 A (Paragraph Number 0004).

However, because map information used for the navigation system is taken a hierarchical structure classified depending on coverage of a road map, when such a bypass search is applied to a hierarchical search, an attempt to bypass a point away from search points (starting point and destination) results in making a bypass search for map information belonging to the upper layer whose data density is low. As a result, a bigger detour than it needs should be made.

SUMMARY OF THE INVENTION

The present invention has been made to solve the above-mentioned problem. An object of the present invention is to provide a navigation system able to search for an appropriate detour even if a bypass region is away from the search points, when searching for a route that detours the bypass region to bypass traffic of a vehicle.

The navigation system according to the present invention, includes map information acquiring means for acquiring map information arranged in a hierarchical structure classified, depending on coverage of a road map; input means for specifying a bypass region to bypass traffic of a vehicle in response to an input operation; and detour searching means for searching a route that detours the bypass region when the bypass region input by the input means is included within the coverage of the map information belonging to a hierarchy acquired by the map information acquiring means.

Through the above configuration, the present invention searches for an appropriate detour even if the bypass region is away from search points, when searching for a route that detours the bypass region to bypass traffic of a vehicle.

DETAILED DESCRIPTION OF THE PREFERRED EMBODIMENTS

The preferred embodiment of the present invention will now be described below with reference to the attached drawings.

First Embodiment

Figure 1:
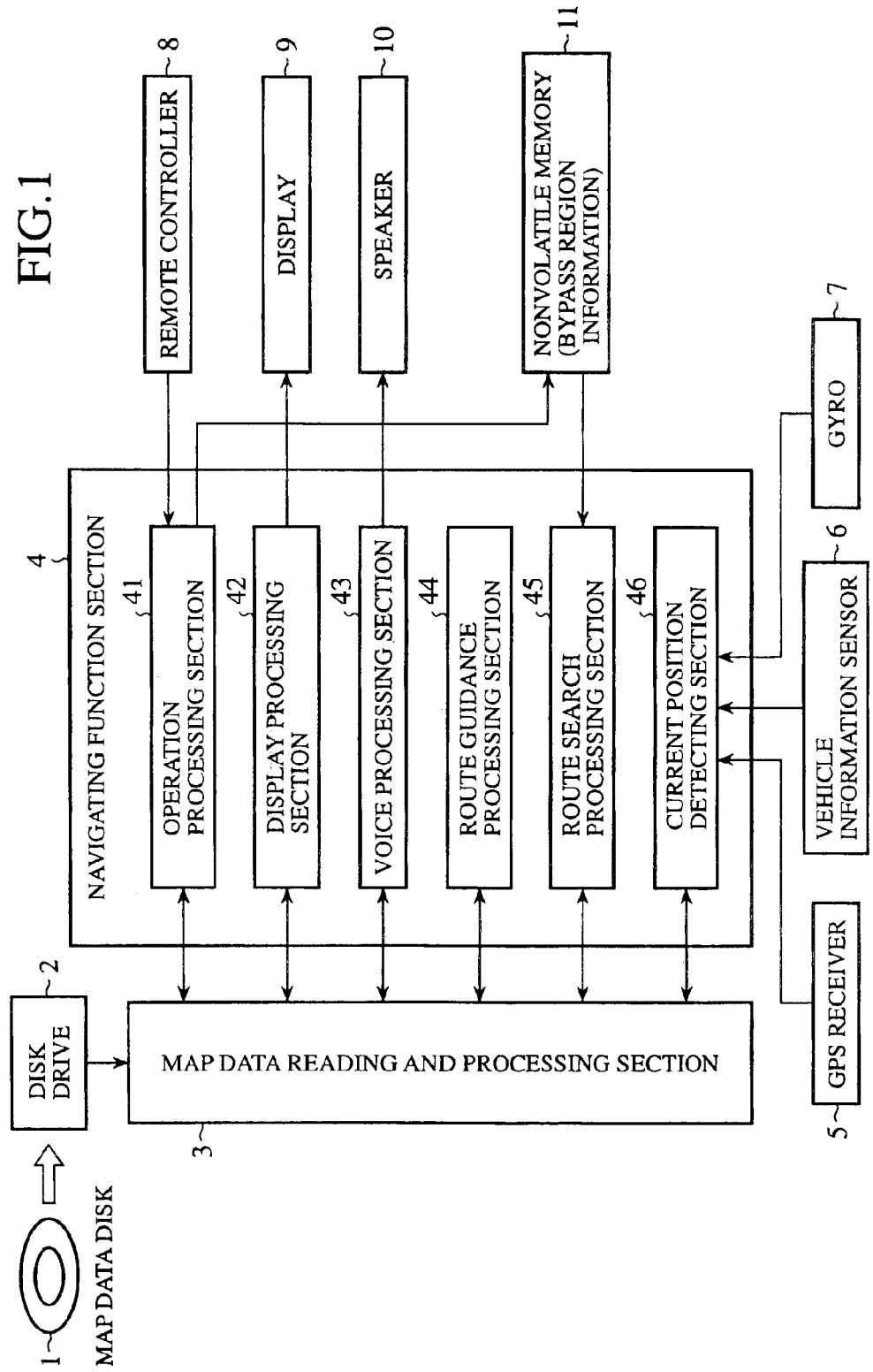
FIG. 1 is a block diagram showing a system configuration of the navigation system according to the first embodiment of the present invention.

FIG. 1 is a block diagram showing the system configuration of the navigation system according to the first embodiment of the present invention.

Referring to FIG. 1, a map data disk 1, made of a CD-ROM or the like, stores map information arranged in a hierarchical structure classified depending on coverage of a road map. A disk drive 2 drives the map data disk 1 to extract the map information. A map data reading and processing section 3 (map information acquiring means) reads and processes the map information extracted by the disk drive 2.

A navigating function section 4 is a section responsive for control of the entire navigation system. The navigating function section includes an operation processing section 41, a display processing section 42 (display control means), a voice processing section 43, a route guidance processing section 44, a route search processing section 45 (detour searching means), and a current position detecting section 46. These sections receive respectively the map information necessary for their processing from the map data reading and processing section 3.

A GPS receiver 5 receives radio waves from satellites and inputs current position information on a vehicle to the current position detecting section 46. A vehicle information sensor 6 inputs vehicle information such as a speed and the distance covered to the current position detecting section 46. A gyro 7 inputs the current azimuth information on a vehicle to the current position detecting section 46. A remote controller 8 (input means) specifies the destination, a bypass region to bypass traffic of a vehicle, and the type of route to be traveled by inputting operation information to the operation processing section 41 in response to a user's input operation. A display 9 (display unit) displays on a screen maps and other information input by the display processing section 42. A speaker 10 outputs a voice in accordance with voice data input by the voice processing section 43. A nonvolatile memory 11 stores the bypass region information that is input by the remote controller 8 and processed by the operation processing section 41, as well as outputs the bypass region information to the rout search processing section 45.

The operation of the navigation system will now be described.

Figure 2:
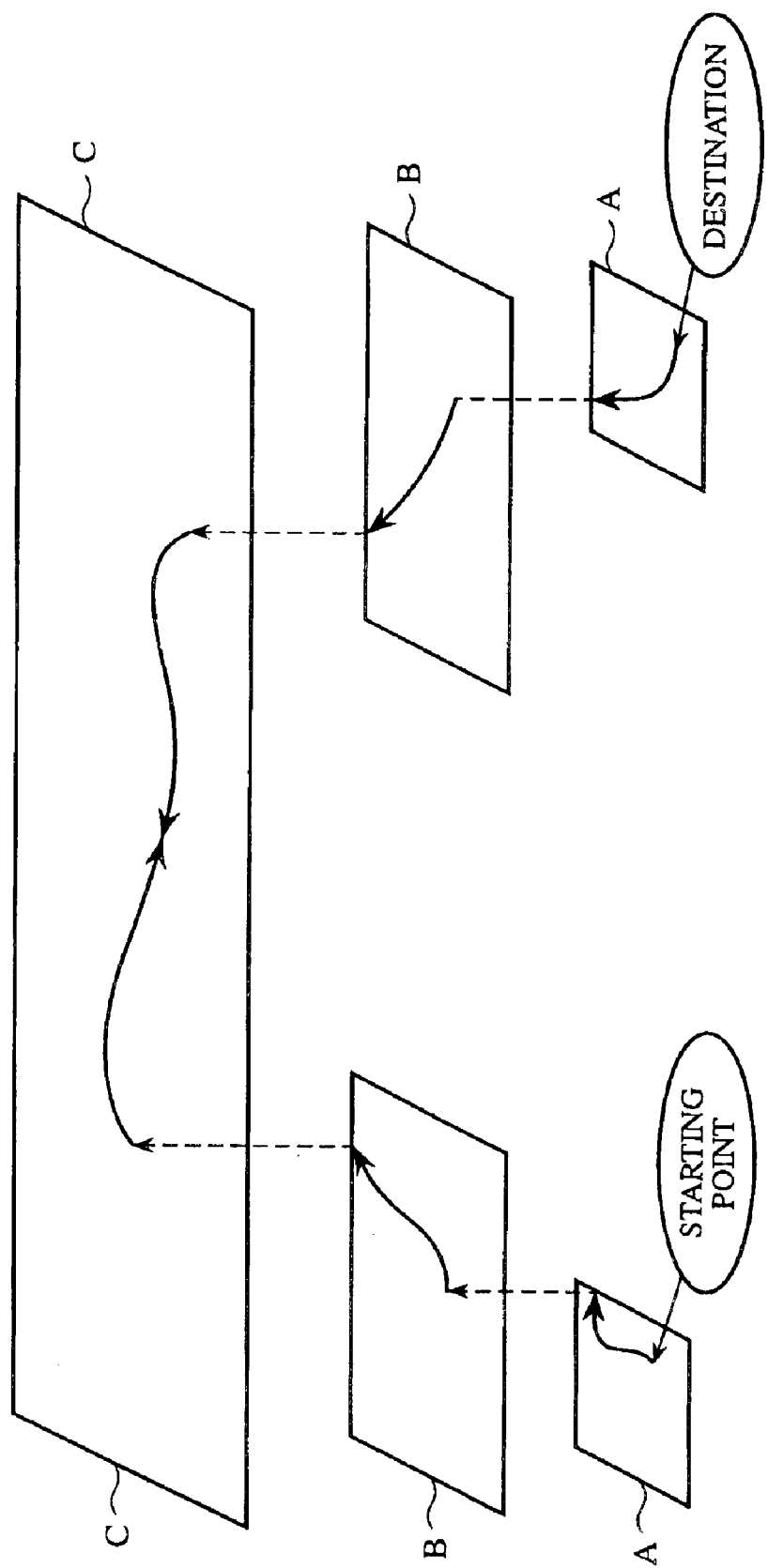
FIG. 2 is a conceptual diagram showing route search processing using map information arranged in a hierarchical structure.

FIG. 2 is a conceptual diagram showing route search processing using map information arranged in a hierarchical structure.

In FIG. 2, a level A is high density map information containing expressways, trunk roads, local roads, and narrow streets, and of which area is small per mesh that is one unit block. A level B situated in a higher level than the level A is medium density map information containing expressways and trunk roads, and of which area is larger per mesh. A level C situated in a higher level than the level B is low density map information containing only expressways, and of which area is much larger per mesh. When making route search processing from the starting point to the destination using the map information thus arranged as above, linkages or routes are traced in order from a low level to a high level in all azimuths from both directions of the starting point and of the destination. When encountered a point at which linkages extending from both directions are connected with each other, the linkage line is assumed to be one of candidates for a route, and candidate for a route to be incurred the lowest cost is ultimately adopted as a final search route.

Figure 3:
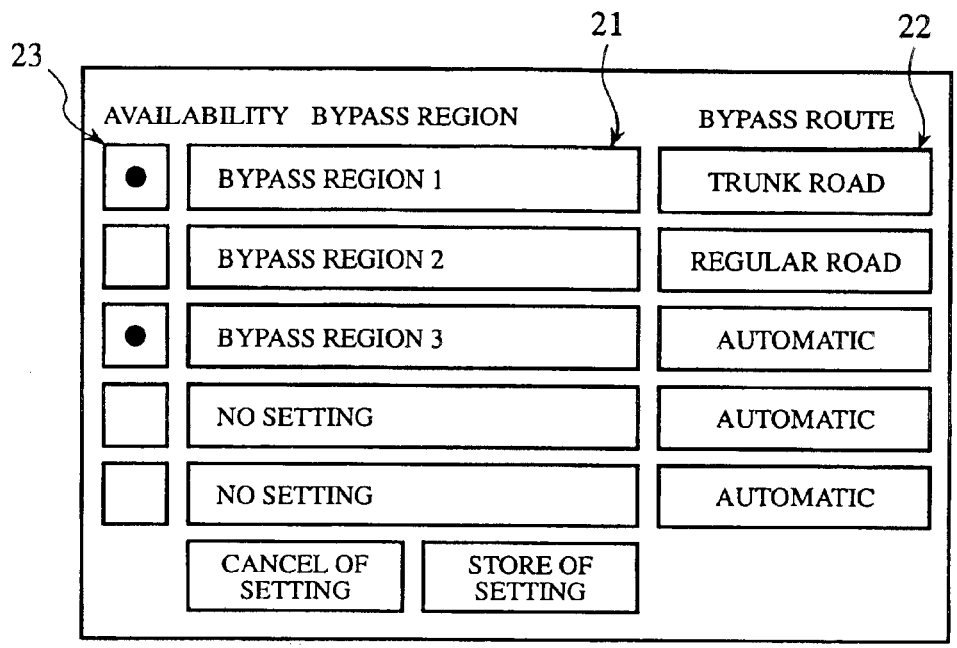
FIG. 3 is a diagram showing a bypass region listing screen in the first embodiment.

FIG. 3 is a diagram showing a bypass region listing screen for specifying a bypass region.

Bypass route icons 22 are specified in a manner as "trunk road", "regular road", and "automatic" for each of icons 21 of a plurality of bypass regions. A mark indicative of "availability" is displayed on an icon 23 for each of bypass regions to be specified. Each of these icons is selected by the remote controller 8.

Figure 4:
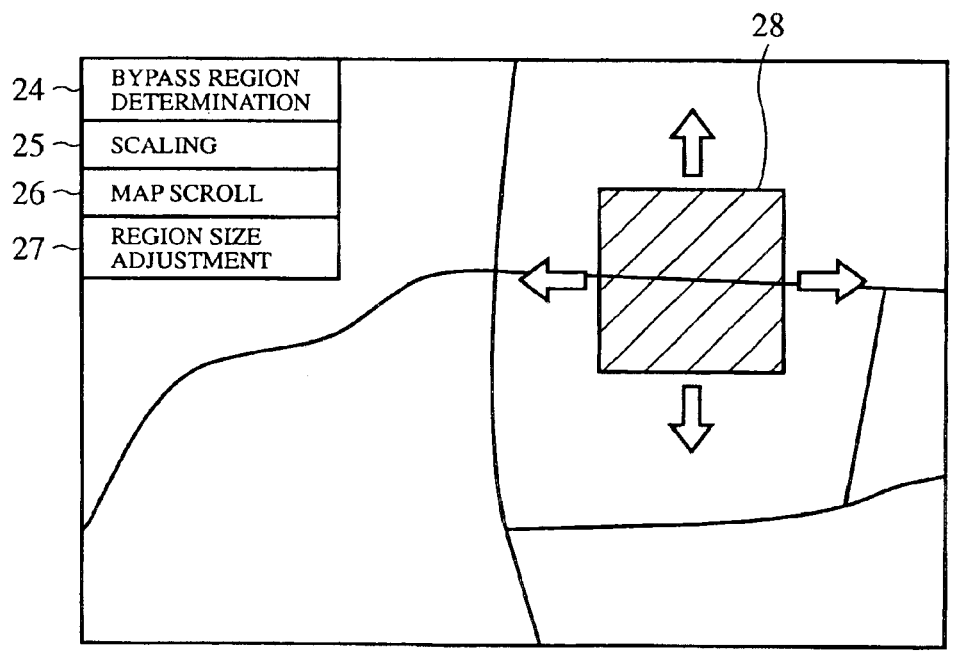
FIG. 4 is a diagram showing a bypass region setting screen in the first embodiment.

FIG. 4 is a diagram showing a bypass region setting screen where some bypass region is selected.

On this screen, bypass region determination icon 24, scaling icon 25, map scroll icon 26, and region adjustment icon 27, as well as a bypass region 28 are displayed, respectively. The hierarchy of the map information can be changed by clicking on the scaling icon 25. The displayed region in the map information belonging to the same hierarchy can be scrolled by clicking on the map scroll icon 26. The size of the bypass region 28 can be adjusted by clicking on the region size adjustment icon 27. In addition, a bypass region is set by clicking on the bypass region determination icon 24, and the process returns to the screen shown in FIG. 3.

Figure 5:
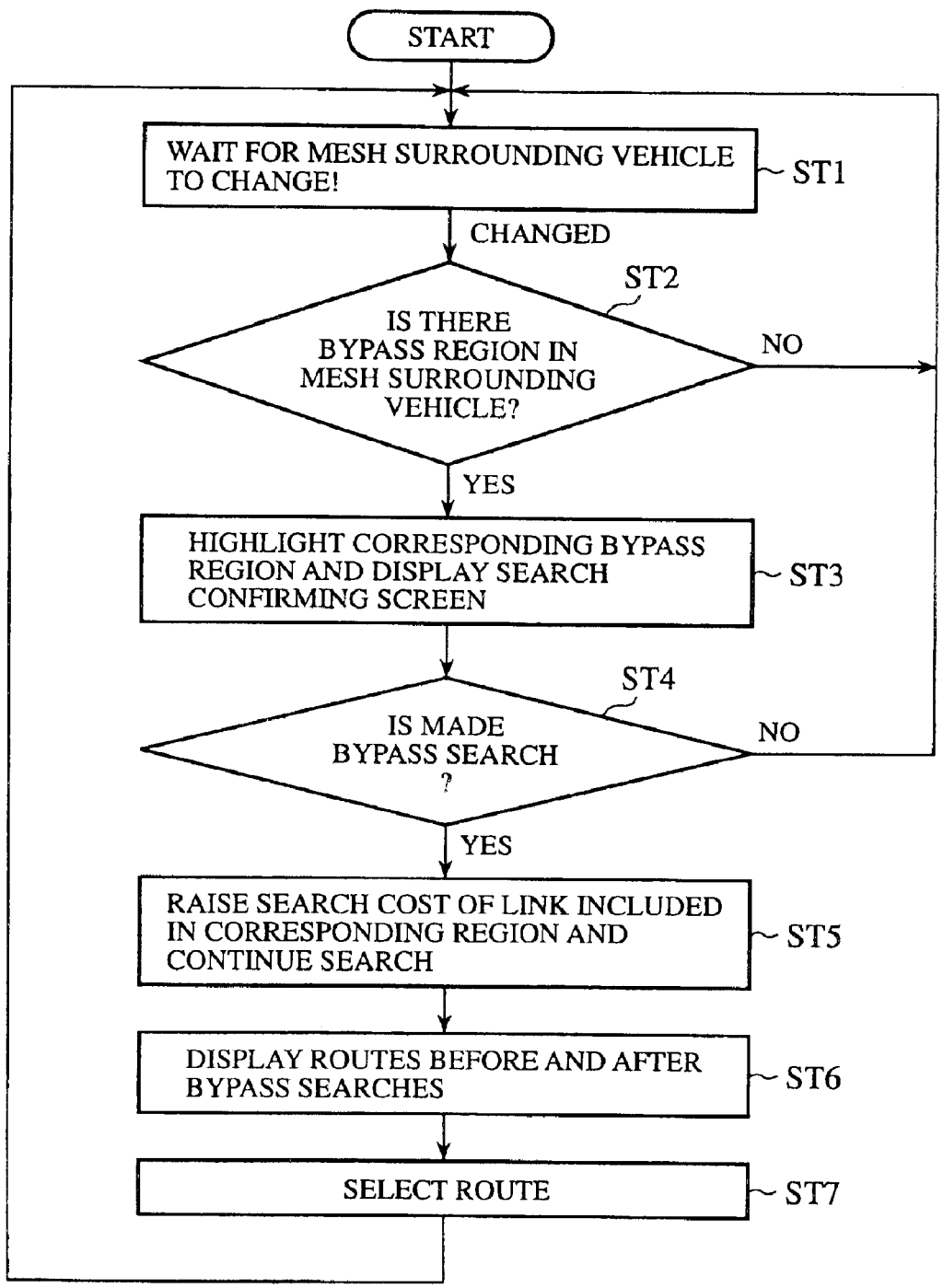
FIG. 5 is a flow chart showing automatic bypass search processing in the first embodiment.

FIG. 5 is a flow chart showing automatic bypass search processing in the first embodiment.

For instance, if a bypass region 3 is selected in FIG. 3, the flow chart shown in FIG. 5 will be executed because the bypass route is "automatic". In this flow chart, a loop from step ST1 to step ST7 is repeatedly executed. First, the process waits for the mesh surrounding a vehicle to change (step ST1). When the mesh is changed, a judgement is made whether or not the bypass region is included inn mesh surrounding the vehicle (step ST2). If the judgement shows that bypass region is not included in n mesh, the process proceeds to step ST1 and waits for the mesh around the vehicle to change.

Figure 6:
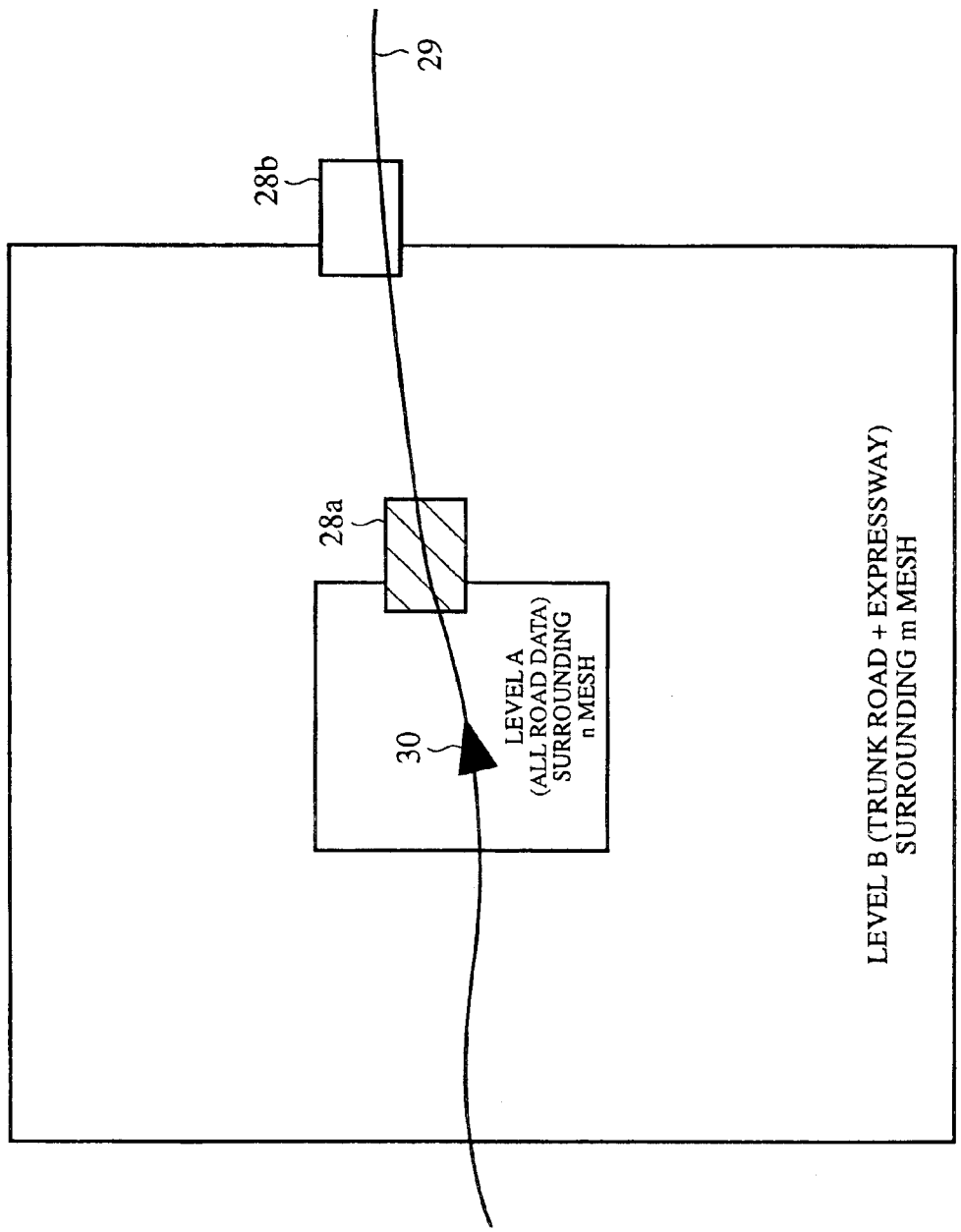
FIG. 6 is a diagram showing the positional relationship between a plurality of meshes surrounding a vehicle and a bypass region in the first embodiment.

FIG. 6 is a diagram showing the positional relationship between a plurality of meshes surrounding a vehicle and a bypass region where a bypass search is made.

Here, suppose that a bypass region 28a is a bypass region where a "regular road" is specified via the icon 22 in FIG. 3, and a bypass region 28b is a bypass region where a "trunk road" is specified via the icon 22 in FIG. 3. The level A is a hierarchy of high density map information containing all road data, and the level B is a hierarchy of map information containing trunk road data and expressway data.

The bypass region 28a is set that a bypass ought to be done using regular roads. Therefore, at the instant when a part of the bypass region 28a is included in the m mesh surrounding a vehicle in the level B of FIG. 6, a bypass search will not begin, but at the instant when a part of the bypass region 28a is included in the n mesh surrounding the vehicle in the level A, a bypass search is made.

On the other hand, because the bypass region 28b is set that a bypass ought to be done using trunk roads, a bypass search begins at the instant when a part of the bypass region 28b is included in the m mesh surrounding a vehicle in the level B of FIG. 6.

When the bypass region is included in the n mesh surrounding the vehicle in step ST2 of FIG. 5, the corresponding bypass region is highlighted and a bypass search confirming screen is displayed (step ST3).

Figure 7:
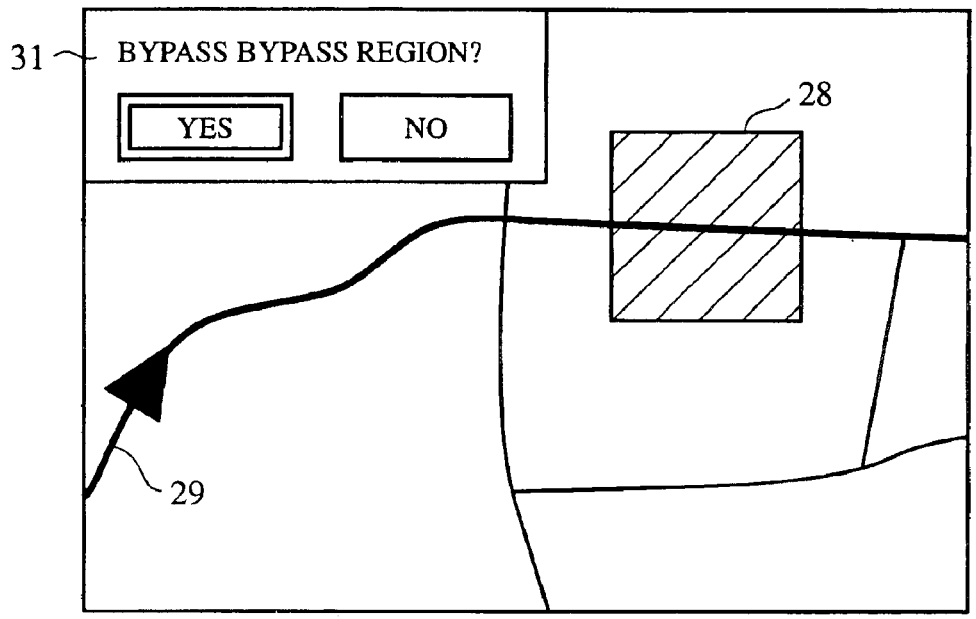
FIG. 7 is a diagram showing a bypass search confirming screen in the first embodiment.

FIG. 7 is a diagram showing the bypass search confirming screen.

On this screen, a bypass search confirming icon 31 is displayed together with a route 29 and the highlighted bypass region 28. Then, a judgement is made whether or not a bypass search is made (step ST4).

When "No" indicative of negation of a search is selected via the icon 31, the process returns to step ST1 and waits for the mesh around the vehicle to change. Otherwise, when "Yes" indicative of confirmation of a search is selected via the icon 31, a search cost of a link included in the corresponding region is raised and a bypass search is continued (step ST5). Subsequently, a route selecting screen is displayed for selecting a route before or after the bypass search (step ST6).

Figure 8:
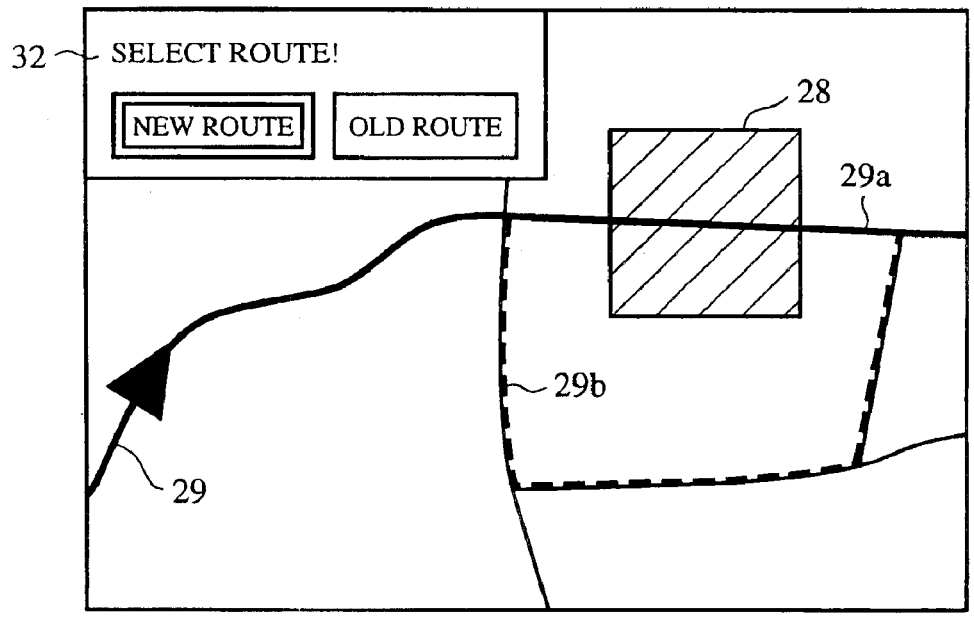
FIG. 8 is a diagram showing a route selecting screen in the first embodiment.

FIG. 8 is a diagram showing a route selecting screen.

On this screen, a route 29a before a bypass search and a route 29b after a bypass search, as well as an icon 32 for selecting the route are displayed. When either of "New Route" or "Old Route" is selected via the icon 32, route selection processing is done (step ST7). After step ST7, the process returns to step ST1 and the above-mentioned loop is repeated.

As mentioned above, according to the first embodiment, the map data reading and processing section 3 acquires the map information arranged in a hierarchical structure classified depending on coverage of a road map, the remote controller 8 specifies a bypass region to bypass traffic of a vehicle in response to an input operation, and the route search processing section 45 of the navigating function section 4 searches for a route detouring the bypass region when the bypass region is included within the coverage of the map information belonging to a hierarchy acquired by the map data reading and processing section 3. As a result, an appropriate detour can be searched even if the bypass region is away from search points when searching for routes detouring the bypass region to bypass traffic of a vehicle.

In the first embodiment, because the remote controller 8 specifies the type of a detour in response to an input operation, the present invention allows search for a detour within the range of the type of a detour a user specified.

Moreover, in the first embodiment, since the route search processing section 45 changes a search starting point depending on what kind of a route is specified, when making an automatic search for a detour, the present invention allows a prompt search for a detour.

In addition, in the first embodiment, because the navigation system further includes the display processing section 42 that highlights a bypass region specified by the remote controller 8 on the display 9, the present invention provides a user easy confirmation of the specified bypass region even when the user is driving.

Additionally, in the first embodiment, because the display processing section 42 highlights the specified bypass route together with a detour searched by the route search processing section 45, the present invention offers a user easy confirmation of the detour and the bypass region even when the user is driving.

What is claimed is:

1. A navigation system comprising:
    map information acquiring device for acquiring map information arranged in a hierarchical structure and classified depending on coverage of a road map the hierarchy structure including levels of a low, medium and high density road information;
    input device for specifying a bypass region to bypass traffic of a vehicle in response to an input operation by a user; and
    detour searching device for searching a route that detours the bypass region only when the bypass region input by the input device is included within the coverage of the map information belonging to the level of hierarchy acquired by the map information acquiring device.

2. The navigation system according to claim 1, wherein the input device specifies the type of a route to be detoured in response to the input operation.

3. The navigation system according to claim 2, wherein the detour searching device changes a search starting point depending on what kind of route is specified when making an automatic search for a detour.

4. The navigation system according to claim 1, wherein further comprises a display control device for highlighting the bypass region specified by the input device on a predetermined display unit.

5. The navigation system according to claim 4, wherein the display control device highlights the bypass route specified together with a detour searched by the detour searching device.

6. The navigation system of claim 1, further comprising a display device that displays said bypass region and detoured route and provides said user with the option of selecting the detoured route.

7. A navigation system comprising:
    a map information device that acquires map data based on the origin of a user and a selected destination, in one of a low, medium or high density level of road information and determines a route;
    a display device that displays the road information in either said low, medium or high density depending on the current location of the user within the route;
    a bypass input device by which the user specifies a region within the route to bypass; and
    a detour searching device that searches a bypass route that detours the bypass region, the detour searching device performing the search when the user reaches an area within the route in which the acquired map data provides the specified bypass region;
    wherein the bypass route is displayed on the display device providing the user with the option to select the bypass route.

* * * * *